(12) United States Patent
Postrozny (10) Patent No.: US 8,877,326 B1
(45) Date of Patent: Nov. 4, 2014

(54) ENHANCED MATERIAL ADHESIVE COMPOSITES

(71) Applicant: Robert Joseph Postrozny, Los Angeles, CA (US)

(72) Inventor: Robert Joseph Postrozny, Los Angeles, CA (US)

( * ) Notice: Subject to any disclaimer, the term of this patent is extended or adjusted under 35 U.S.C. 154(b) by 0 days.

(21) Appl. No.: 13/784,016

(22) Filed: Mar. 4, 2013

Related U.S. Application Data (60) Provisional application No. 61/606,302, filed on Mar. 2, 2012.

(51) Int. Cl.
   B32B 3/00 (2006.01)
   C09D 5/22 (2006.01)
   B32B 27/08 (2006.01)
   B32B 3/10 (2006.01)
   B32B 5/16 (2006.01)
   B32B 7/12 (2006.01)
   C09J 7/02 (2006.01)

(52) U.S. Cl.
   CPC . *C09D 5/22* (2013.01); *B32B 27/08* (2013.01); *B32B 3/10* (2013.01); *B32B 5/16* (2013.01); *B32B 7/12* (2013.01); *C09J 7/0264* (2013.01); *B32B 2307/422* (2013.01)
   USPC .......................... 428/195.1; 428/207; 428/690

(58) Field of Classification Search
   CPC .................................................. B32B 2307/422
   USPC ............................................... 428/195.1, 690
   See application file for complete search history.

(56) References Cited

U.S. PATENT DOCUMENTS 6,656,566 B1 * 12/2003 Kuykendall et al. .......... 428/138
2012/0026719 A1 * 2/2012 Sugiyama et al. .............. 362/84

* cited by examiner

*Primary Examiner* — Elizabth Mulvaney (57) ABSTRACT

Apparatus and method for a photoluminescent composite. The composite comprises a film layer (e.g., clear, mirrored, reflective, or graphically printed) and a material mixture (e.g., comprising epoxy, urethane, polyurethane, or silicone) deposited above the film layer. The composite further comprises a pigment mixture having a photoluminescent property (e.g., phosphorescence or fluorescence). In one embodiment, the material mixture comprises the pigment mixture. The film layer may comprise a vinyl material. The composite may further include a double-sided adhesive, where a portion of the double-sided adhesive is deposited above a top portion of the film. The material mixture may have a thickness greater than 0.040 inches thick.

20 Claims, 11 Drawing Sheets

ENHANCED MATERIAL ADHESIVE COMPOSITES

RELATED U.S. APPLICATIONS

This application claims the benefit of and priority to the provisional patent application, Ser. No. 61/606,302, entitled "Novel Epoxy Composites," with filing date Mar. 2, 2012, and hereby incorporated by reference in its entirety.

BACKGROUND

There is currently a high demand in the market place for durable vinyl films, tapes, and resins that serve both protective and aesthetic function. In the mobile device market for example, consumers demand a means to protect their expensive device in a sleek and stylish way without adding unnecessary bulk to the original design of the device. In addition, as people have made their mobile devices a more integral part of their lives, the hardware of mobile devices have become a canvas with which to express their own individuality and style much like clothing, bags, and shoes do. With mobile technology getting smaller and slimmer, there is also an added need to be able to quickly locate the device whenever the device is needed.

Conventional vinyl films are inadequate to fulfill this demand in that the films stretch, tear, have short life spans, and are not able to protect from impact. Conventional vinyl films are also limited to a set color palette. If graphically printed upon, the images are subject to damage, wear, and fading.

Resins are a more durable alternative to vinyl films in that they are thicker, but are very difficult to work with in that they have to be mixed, applied, and cured from liquid components on site causing messy and imprecise results. If applied directly to a surface, they are often permanent and cannot be repositioned or reused on another surface. If molded, they are often bulky and imprecise. Epoxy components also require specific storage conditions and have a limited shelf life.

SUMMARY

The present invention has been made in view of the above circumstances and provides a material composite, which advantageously combines the best qualities of vinyl films and resins to create a more versatile material. Embodiments of the present invention may achieve longer lasting and brighter luminescence, faster photoluminescent 'charge times' and produce new colors and patterns of luminescence that are not achievable with conventional vinyl films and resins. Embodiments of the present invention are more durable with a better resistance to wear, tear, chemicals, stains, impact and provide better protection to whatever object they are affixed to (e.g. mobile devices, screen displays, signs, walls, etc.). Embodiments of the present invention are also easier to apply and remove, may be re-used on different surfaces, may be transparent to allow for surface visibility and may be substantially cheaper to produce compared to conventional photoluminescent vinyl films and resins.

In one embodiment, a material composite comprises a film layer (e.g., clear, mirrored, reflective, or graphically printed) and a material mixture (e.g., comprising epoxy, urethane, polyurethane, or silicone) deposited above the film layer. The composite further comprises a pigment mixture having a photoluminescent property (e.g., phosphorescence or fluorescence). In one embodiment, the material mixture comprises the pigment mixture. The film layer may comprise a vinyl material. The composite may further include a double-sided adhesive, where a portion of the double-sided adhesive is deposited above a top portion of the film. The material mixture may have a thickness greater than 0.040 inches thick.

In another embodiment, a material adhesive composite comprises a material mixture (e.g., epoxy, urethane, polyurethane, or silicone) deposited above an adhesive layer (e.g., comprising microspheres or acrylic). The material adhesive composite further comprises a pigment mixture having a photoluminescent property (e.g., phosphorescence or fluorescence). The adhesive layer may be double sided, pressure sensitive, and removable. In one embodiment, the material mixture and adhesive layer may be optically clear wherein a portion of the desired surface it is adhered to is visible.

In another embodiment, a method for manufacturing a material composite comprises forming an epoxy mixture containing photoluminescent pigment and applying the epoxy mixture to a vinyl layer. This method includes forming a material composite that is operable to output a composite color comprising a first color from the photoluminescent pigment and a second color from a portion of the vinyl layer. In one embodiment, the photoluminescent epoxy mixture is operable to output a luminescent pattern based on a pattern from the vinyl film layer.

DETAILED DESCRIPTION

In one embodiment, a versatile photoluminescent (e.g. phosphorescent, fluorescent, etc.) material is made by combining a material mixture (e.g. epoxy, urethane, silicone, etc.) with vinyl film. This material composite may comprise a layer of clear resin infused with hardener and photoluminescent pigment, which is affixed to vinyl that may be permanent, changeable, or removable and have various advantageous physical properties.

Embodiments of the present invention may include a photoluminescent material composite, which advantageously combines the best qualities of conventional photoluminescent vinyl films and resins (e.g. epoxy, urethane, silicone, etc.) to create a more versatile photoluminescent material. Embodiments of the present invention may achieve longer lasting and brighter luminescence, faster photoluminescent 'charge times' and produce new colors and patterns of luminescence that are not achievable with conventional vinyl films and resins. Embodiments of the present invention are more durable with a better resistance to wear, tear, chemicals, stains, impact and provide better protection to whatever object they are affixed to (e.g. mobile devices, screen displays, signs, walls, etc.). Embodiments of the present invention are also easier to apply and remove, may be re-used on different surfaces, may be transparent to allow for surface visibility and may be substantially cheaper to produce compared to conventional photoluminescent vinyl films and resins.

FIGS. 1, 2A-2G, 4, 5A-5G, 7A-7E, and 8A-8C illustrate example components used by various embodiments of the present invention. Although specific components are disclosed in diagram 100, 400, 700, and 800 it should be appreciated that such components are examples. That is, embodiments of the present invention are well suited to having various other components or variations of the components recited in composites 100, 400, 700, and 800. It is appreciated that the components in composites 100, 400, 700, and 800 may operate with other components than those presented, and that not all of the components of composites 100, 400, 700, and 800 may be required to achieve the goals of composites 100, 400, 700, and 800.

Figure 1:
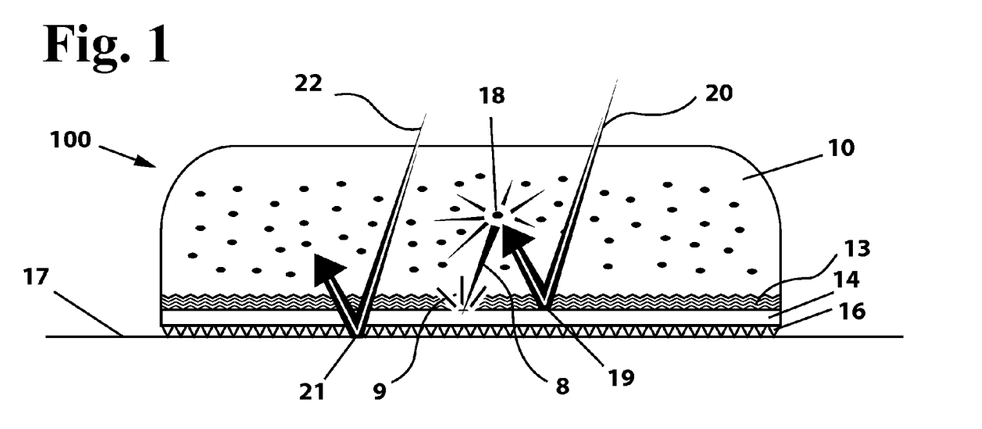
FIG. 1 shows a cross-sectional view of an exemplary photoluminescent material composite in accordance with one embodiment.

FIG. 1 shows a cross-sectional view of an exemplary photoluminescent material composite 100 in accordance with one embodiment. In one embodiment, photoluminescent material composite 100 includes a layer of clear, hardened resin 10 infused with a mixture of photoluminescent pigment 18 of varying luminescence and color. Resin 10 may be permanently affixed atop vinyl 14 with an adhesive backing 16 that can be applied to surface 17 (e.g. glass, metal, plastic, wood, etc.). For added durability in preventing vinyl 14 peeling from resin 10, a clear adhesive layer 13 (e.g. 3M Adhesive Transfer Tape F-9465PC available from 3M Industrial Adhesives and Tapes Division at 3M Center, Building 21-1W-10, 900 Bush Ave. St. Paul, Minn. 55144-1000) may be added between resin 10 and vinyl 14. In one exemplary embodiment, vinyl 14 or surface 17 may be visible through resin 10. Vinyl 14 may also be clear, mirrored, reflective, or graphically printed.

As light rays 20 enter resin 10, light rays 20 charge photoluminescent pigment 18 that may be suspended throughout resin 10. If vinyl 14 and bottom adhesive backing 16 are clear, light rays 22 will pass through photoluminescent material vinyl 100 and reflect off surface 17 at point 21 making surface 17 visible through photoluminescent material vinyl 100. If vinyl 14 is a reflective or mirrored material (e.g. RtapeVinlefx Silver Chrome available from the Rtape Corporation headquartered at 6 Ingersoll Road South Plainfield, N.J. 07080) light rays 20 will reflect off its surface 19 thereby charging a greater surface area of photoluminescent pigment 18 at a higher energy level due to the low absorption rate from vinyl 14. Since photoluminescent pigment 18 may be suspended in resin 10 at a distance above vinyl 14 instead of resting directly on top of vinyl 14 like with conventional photoluminescent vinyl films, the underside of pigment 18 may be exposed to reflected light rays 20 that have bounced off of vinyl 14. This will in turn cause the underside of photoluminescent pigment 18 to glow, thereby increasing the overall luminescence of photoluminescent pigment 18. Photoluminescent material composite 100 may thereby advantageously achieve brighter and longer luminescence than conventional photoluminescent vinyl films and resins.

Conventional photoluminescent vinyl films and tapes are generally very thin (e.g. 0.002-0.010 inch thick) and are thus restricted to a small vertical volume of space with which pigment may be properly affixed to. When large particles of photoluminescent pigment reach a greater size than the vertical volume of the material allows, a rough surface texture results and the photoluminescent pigment may separate from the vinyl entirely. Additionally, when too much of photoluminescent pigment is used in conventional vinyl films so that there is no buffer space between each particle, some particles of the photoluminescent pigment may be blocked entirely from light by neighboring photoluminescent particles, thereby preventing the pigment's ability to luminesce.

In one exemplary embodiment, the layer of resin 10 may be significantly thicker than conventional photoluminescent vinyl films to create conditions operable to produce brighter and longer levels of luminescence. Resin 10 may be 0.040-0.125 inch thick or greater. The added volume of resin 10 may allow a larger amount of photoluminescent pigment 18 to be included in resin 10 as well as a significantly larger particle size of photoluminescent pigment 18 without blocking neighboring pigment. Therefore, because larger sized particles of photoluminescent pigment 18 have brighter and longer luminescent properties than smaller photoluminescent particles, and because added photoluminescent pigment will increase overall luminescence, photoluminescent material composite 100 may achieve brighter and longer levels of luminescence than conventional photoluminescent vinyl films.

Conventional photoluminescent vinyl films and tapes generally have irregular and grainy luminescence when containing larger size particles of photoluminescent pigment in its material. Because there is limited vertical volume for particles to rest, they may therefor need to be placed next to each other horizontally rather than vertically to avoid blocking light rays that are able to charge the photoluminescent particles. Spaces are thus created in between the particles of the photoluminescent pigment that will not contain any pigment and therefore will not glow, resulting in irregular luminescence.

Embodiments of the present invention are operable to produce a more uniform and smoother luminescence than conventional vinyl films. The added vertical volume of resin 10 may allow photoluminescent pigment 18 to be stacked and suspended throughout resin 10 in a more uniform way and with more buffer space to allow light rays 20 to reach neighboring photoluminescent pigment 18.

In one embodiment, light 8 emitted from photoluminescent pigment 18 may be paired with light 9 from fluorescent colored vinyl 14 (e.g. neon green, yellow, red, pink, orange, etc.) to create previously unseen colors of luminescence in conventional photoluminescent resins or vinyl films. When light 8 is emitted from pigment 18, some rays of light 8 will travel to the surface of vinyl 14. If vinyl 14 is fluorescent in color, light 8 will get absorbed and then re-radiated as light 9 at a different wavelength instead of being converted into heat. The combination of light 8 and light 9 creates a unique brightness and hue of photoluminescent material composite 100. With conventional solutions, both photoluminescent pigment 18 and a fluorescent pigment may be mixed together in resin 10. Some of the fluorescent pigment would block photoluminescent pigment 18 from light rays 20, thereby reducing the luminescent strength of light 8 from photoluminescent pigment 18. The obstruction of light rays 20 caused by the fluorescent pigment suspended in resin 10 would in turn limit the brightness and luminescent strength of the photoluminescent material. Photoluminescent material composite 100 may thereby advantageously create unseen colors of luminescence and brighter luminescence than with conventional fluorescent vinyl films and resins by pairing fluorescent colored vinyl 14 with resin 10 containing photoluminescent pigment 18.

Embodiments of the present invention are operable to produce various luminescent patterns of varying degrees of brightness in resin 10 of photoluminescent material composite 100. A desired luminescent pattern or marking (e.g. text, graphics, symbols, numbers, patterns, etc.) may be created in resin 10 by charging photoluminescent pigment 18 at varying degrees determined by the desired marking affixed (e.g. printed, stamped, deposited, etc.) to vinyl 14. For example, if a striped luminescent pattern is desired in resin 10, different color stripes of varying lightness and darkness, including but not limited to black and white, may be printed on vinyl 14. The black stripes on vinyl 14 will absorb a greater amount of light rays 20 at surface 19 than a lighter color portion thereby reducing the number of reflected light rays 20 able to charge photoluminescent pigment 18. The result will be a dimmer luminescence of the photoluminescent pigment 18 located above (e.g. directly above) the black printed line on vinyl 14. Conversely, a white stripe on vinyl 14 will reflect more of light rays 20 than its black stripe counterpart and thereby charge a greater amount of photoluminescent pigment 18 particles above the white stripe. This contrast of luminescence in portions of photoluminescent pigment 18 above the white and black printed stripes will in turn create a striped luminescence.

In one exemplary embodiment, a graphical image may be printed on vinyl 14 to replicate the look of a pigment mixture in resin 10, which makes the composite cheaper to produce and more easily replicable. In order to replicate the desired effect of colored pigment infused in resin 10, a graphical representation can be printed on vinyl 14 before resin 10 is applied thus replicating the way colored pigment would disperse throughout resin 10 (e.g. in areas where there is less resin, such as sloped areas at the edges of the composite or cutouts, there will be less pigment which creates a lighter, 'faded' look). This is a cheaper and faster alternative than having to mix desired pigment in resin 10. It also enables the desired aesthetic result to be replicated more easily than would be otherwise possible with conventional color pigment. If other pigments were present in resin 10 they may potentially block photoluminescent pigment 18 from light rays 20.

Figure 2A:
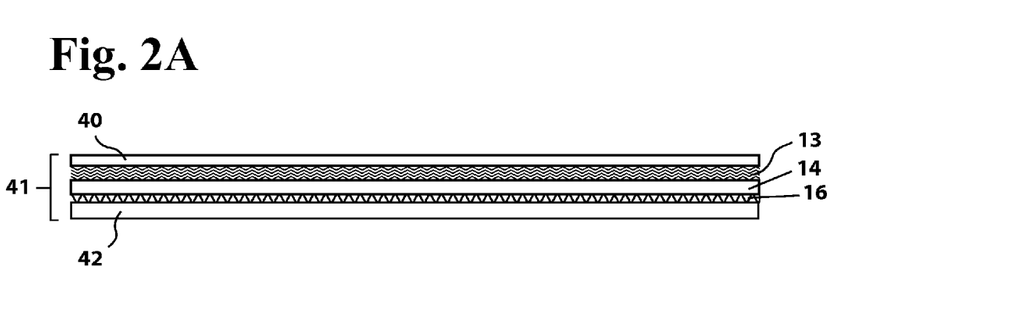
FIG. 2A shows a cross-sectional view of an exemplary layered vinyl composite in accordance with one embodiment.

FIG. 2A shows a cross-sectional view of an exemplary layered vinyl composite 41 in accordance with one embodiment. Adhesive layer 13 with top liner 40 is applied to vinyl layer 14 containing bottom adhesive 16. Base vinyl liner 42 is attached to the bottom adhesive 16.

Figure 2B:
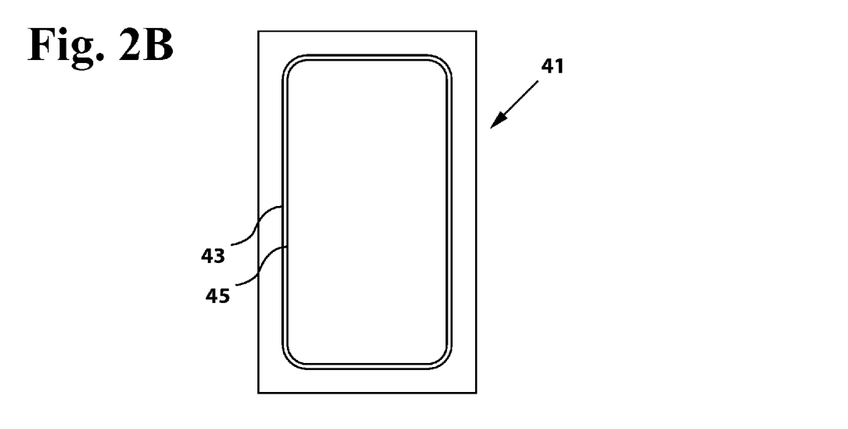
FIG. 2B shows a front view of an exemplary layered vinyl composite with cut lines applied in accordance with one embodiment.

FIG. 2B shows a front view of an exemplary layered vinyl composite 41 with cut lines applied in accordance with one embodiment. Cutline 45 represents the shape and dimension of the final product and the area within which resin 10 will be applied. Cutline 43 is formed around cutline 45. Although the distance between the two cut lines may vary, it is important that the distance between cut lines 43 and 45 is wide enough to create a margin area in which vinyl composite 41 may be peeled away from liner 42 (as shown in FIG. 2A) within cuts 43 and 45.

Figure 2C:
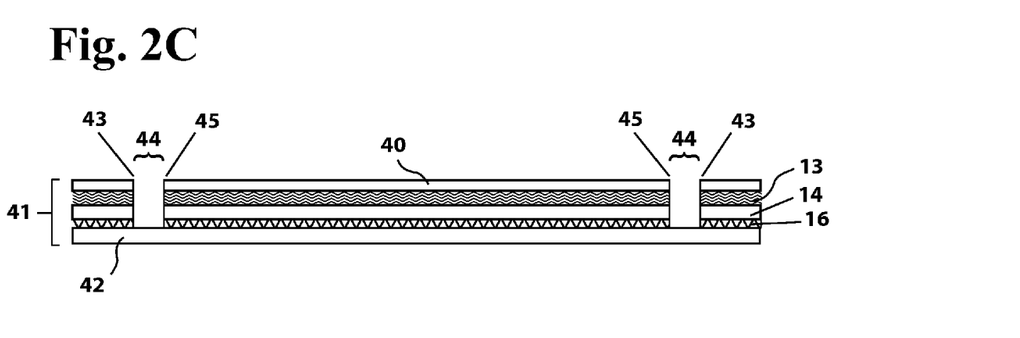
FIG. 2C shows a cross-sectional view of an exemplary layered vinyl composite with barrier creation in accordance with one embodiment.

FIG. 2C shows a cross-sectional view of an exemplary layered vinyl composite 41 (as shown in FIG. 2B) with recess 44 in accordance with one embodiment. Recess 44 is created by peeling away the composite material within cut lines 43 and 45 as described in FIG. 2B.

Figure 2D:
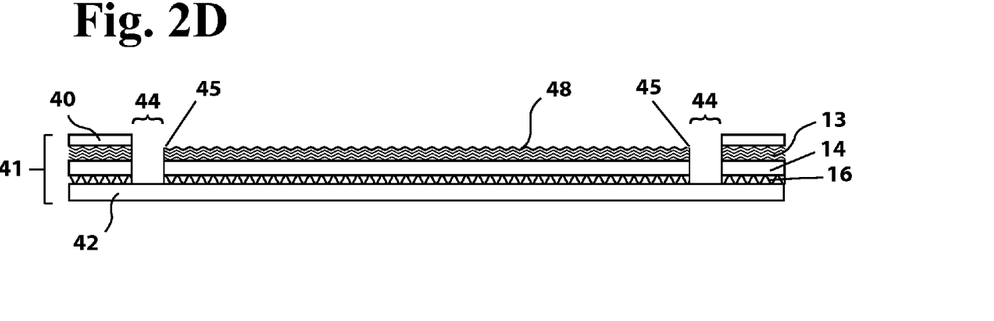
FIG. 2D shows a cross-sectional view of an exemplary layered vinyl composite with adhesive liner removed in accordance with one embodiment.

FIG. 2D shows a cross-sectional view of an exemplary layered vinyl composite 41 with a portion of adhesive liner 40 removed in accordance with one embodiment. Adhesive liner 40 is peeled off the composite within cut line 45, leaving surface 48 of adhesive 13 exposed.

Figure 2E:
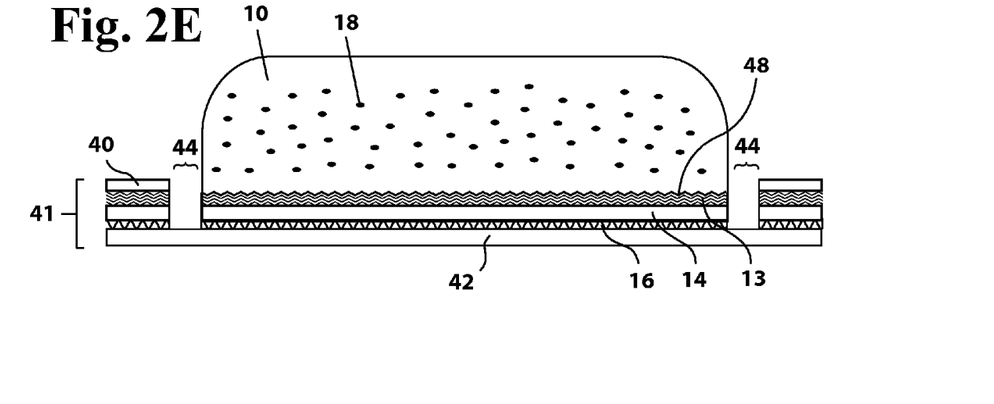
FIG. 2E shows a cross-sectional view of an exemplary photoluminescent material mixture deposited on a layered vinyl composite in accordance with one embodiment.

FIG. 2E shows a cross-sectional view of an exemplary photoluminescent material mixture (e.g. 10 and 18) deposited onto surface 48 of adhesive 13 in accordance with one embodiment. Resin 10 will spread atop surface 48 and stop at the edge of composite 41 before recess 44.

Figure 2F:
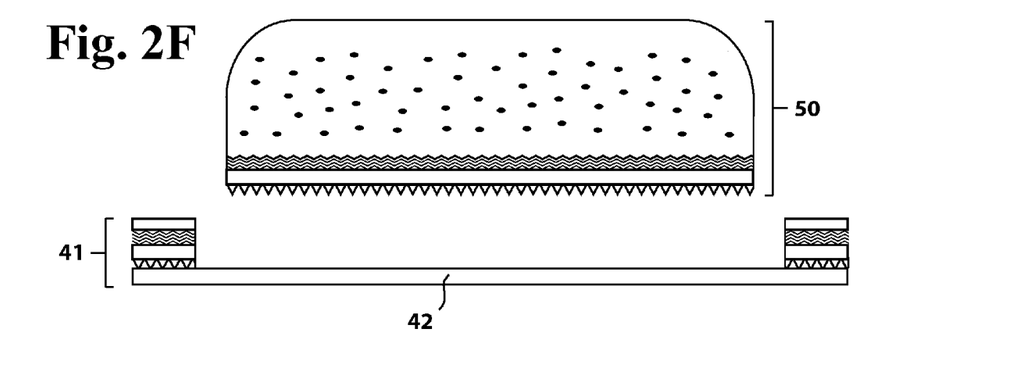
FIG. 2F shows a cross-sectional view of an exemplary photoluminescent material composite as removed from base liner in accordance with one embodiment.

FIG. 2F shows a cross-sectional view of an exemplary photoluminescent material composite 50 as removed from base liner 42 in accordance with one embodiment. After resin 10 is cured, photoluminescent material composite 50 can then be peeled off from base liner 42 or stored attached to base liner 42 for later use.

Figure 2G:
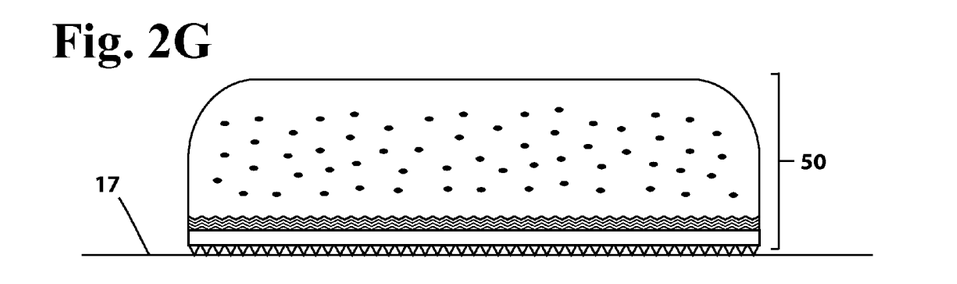
FIG. 2G shows a cross-sectional view of an exemplary photoluminescent material composite placed onto a desired surface in accordance with one embodiment.

FIG. 2G shows a cross-sectional view of an exemplary photoluminescent material composite 50 placed onto desired surface 17 in accordance with one embodiment. It is appreciated that photoluminescent material composite 50 may be of varying degrees of thickness. Photoluminescent material composite 50 made in accordance with embodiments of the present invention can be produced in sheets or rolls for later cutting or custom manufactured by applying photoluminescent material over a precut vinyl design as shown in FIGS. 2A-2G.

Figure 3:
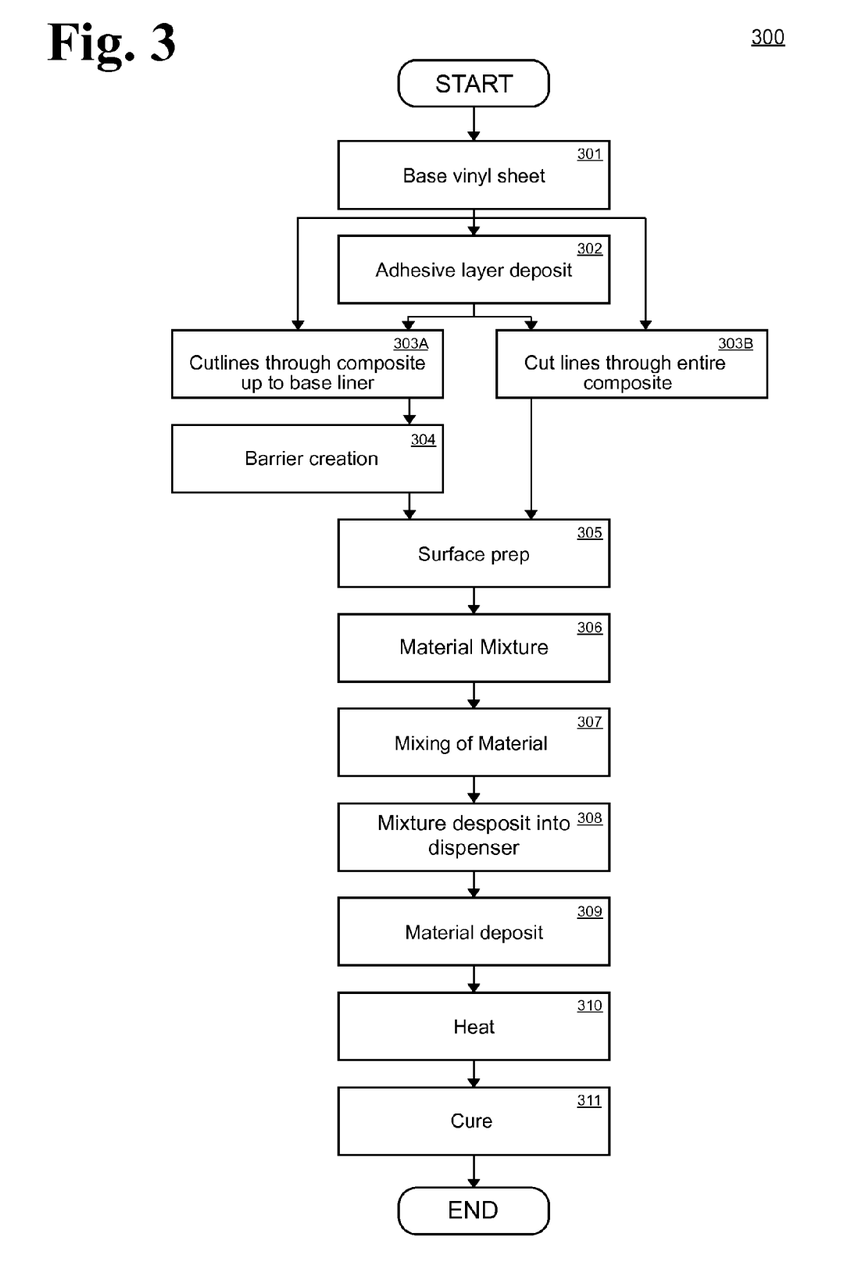
FIG. 3 shows a flowchart of an exemplary process for creating a photoluminescent material composite in accordance with one embodiment.
Figure 6:
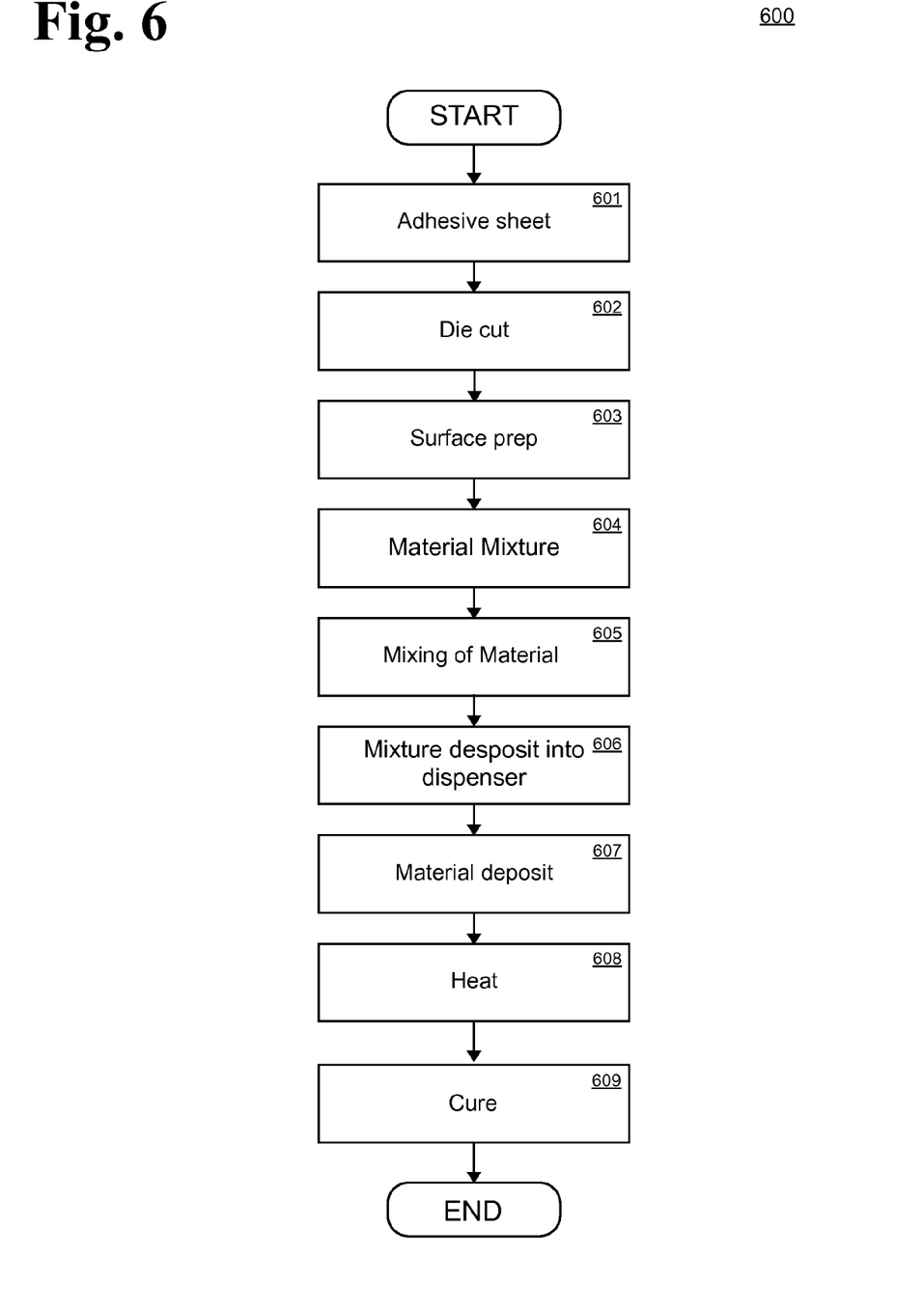
FIG. 6 shows a flowchart of an exemplary process for creating a material adhesive composite in accordance with one embodiment.

With reference to FIG. 3 and FIG. 6, exemplary flowcharts 300 and 600 illustrate example processes used by various embodiments of the present invention. Although specific blocks are disclosed in flowcharts 300 and 600, such blocks are exemplary. That is, embodiments are well suited to performing various other blocks or variations of the blocks recited in flowcharts 300 and 600. It is appreciated that the blocks in flowcharts 300 and 600 may be performed in an order different than presented, and that not all of the blocks in flowcharts 300 and 600 may be performed. Flowcharts 300 and 600 include processes that, in various embodiments, may be carried out by a computer or processor under the control of computer-readable and computer-executable instructions.

FIG. 3 shows a flowchart of an exemplary process for creating a photoluminescent material composite in accordance with one embodiment. Process 300 may be used to manufacture photoluminescent material composite 100.

At block 301, a vinyl sheet layer is removably attached to a bottom liner (e.g. Controltac with Comply Vinyl by 3M available from 3M Industrial Adhesives and Tapes Division at 3M Center, Building 21-1W-10, 900 Bush Ave. St. Paul, Minn. 55144-1000). The vinyl sheet may be graphically printed with desired color, graphics, or text that is acquired or selected. A plurality of vinyl and material types with varying degrees of colors and physical properties may also be used, such as those discussed in reference to FIG. 100.

At block 302, an adhesive may optionally be affixed to the top of the vinyl sheet layer from block 301. The adhesive may be affixed to provide added durability. In one embodiment, the adhesive may be a double-sided adhesive (e.g. 3M Adhesive Transfer Tape F-9465PC). The adhesive may keep its top liner on the material in order to safely run the vinyl composite though a cutting machine without composite getting stuck to or damaging equipment. Block 302 may be skipped if the added durability of including double-sided adhesive is not deemed necessary or if the added production cost is not feasible for the desired project.

At block 303A, in one exemplary embodiment two cut lines that run parallel to each other (e.g. at a distance of 1-3 mm apart) are made through each layer of the composite up until the base vinyl liner. The two cut lines form an outline of the eventual desired shape of the composite, with the inside cutline representing the edges of the desired shape.

Block 303B may be performed in place of 303A. At block 303B, in one exemplary embodiment a cut line (e.g. die cut) is made through the entire composite, which includes the base liner, forming a standalone cutout of the desired shape.

At block 304, the material within the two cut lines that were made into the vinyl composite at block 303A is then peeled away creating a vertical differential between the top of the material composite and the remaining base liner. This vertical differential acts as a barrier when the material (e.g. in resin form) is later deposited on top of the vinyl composite utilizing surface tension to prevent it from overflowing over the cut line. Step 304 may not be performed if step 303B was completed as there is a natural vertical drop at the edges of the standalone cutout of the desired shape, thus creating the necessary barrier.

At block 305, the top liner within the cut of the desired primary shape is then peeled away exposing the top adhesive surface of the double-sided adhesive layer. This step may be done in a contained, dust-free environment to avoid debris contaminating the top adhesive. Blocks 306-311 may be performed on a flat surface in a closed environment free of dust or debris to avoid contamination.

At block 306, a material mixture composed of epoxy, urethane, silicone, plastic, or other malleable material formulations may be combined with pigments of various properties (e.g. photoluminescent, phosphorescent, fluorescent, etc.). In one exemplary embodiment a photoluminescent epoxy mixture may be created using the following components:
  1 part photoluminescent pigment (e.g., alkaline rare earth metal silicate, alkaline earth metal silicioaluminate europium doped, aluminate oxide europium doped, calcium sulfide, or other photoluminescent compounds). The amount can be increased or decreased depending on pigment type or brand.
  4 part flexible, epoxy doming resin (e.g. epoxy resin in Deco-Coat 2550 Resin System by Epoxies, Etc. headquartered at 21 Starline Way, Cranston, R.I. 02921)
  4 part epoxy hardener (e.g. hardener in Deco-Coat 2550 Resin System by Epoxies, Etc. headquartered at 21 Starline Way, Cranston, R.I. 02921)

In another embodiment, a near transparent photoluminescent epoxy mixture may comprise:
  0.25-0.85 parts photoluminescent pigment (Amount can be increased or decreased depending on pigment type or brand and desired clarity)
  4 part flexible, epoxy doming resin (e.g. epoxy resin in Deco-Coat 2550 Resin System by Epoxies, Etc. headquartered at 21 Starline Way, Cranston, R.I. 02921)
  4 part epoxy hardener (e.g. hardener in Deco-Coat 2550 Resin System by Epoxies, Etc. headquartered at 21 Starline Way, Cranston, R.I. 02921)

At block 307, the components from block 306 are mixed together such that each component is evenly or near evenly dispersed throughout resin. In one exemplary embodiment, a batch of 75 ounces containing the material mixture described in block 306 may be mixed for five minutes. If the batch size were doubled, the mixing time may be increasing by three more minutes. Mixing can be done by hand or by machine. It is advantageous to proceed to the next step after the optimal mixing time is reached to avoid pigment settling to the bottom of the resin thus causing an uneven distribution of pigment throughout the resin mixture.

At block 308, the material mixture is then deposited into a dispenser (e.g. syringe, caulking gun, pneumatic dispenser, meter mixer, etc.). In one exemplary embodiment block 308 can be combined with block 307 if using a meter mixer.

At block 309, the material mixture may then be dispensed over the exposed adhesive layer of the vinyl composite. The amount of the material mixture deposited per unit area depends upon the desired thickness of layer. Generally, this layer can be 0.5-3 mm in height, but can be adjusted accordingly with methods well known within the industry. For a material mixture composed of photoluminescent pigment at a particle size of 20 microns and below, an object (e.g. skewer made of wood, metal, plastic, etc.) may be used to help spread the material mixture over the surface of the vinyl composite. For a material mixture containing photoluminescent pigment at a particle size of 20 microns and above, a skewer or may not be used to spread the epoxy mixture to ensure that the photoluminescent pigment is evenly dispersed throughout epoxy resin and prevent any clumping of pigment in the path of the skewer.

At block 310, heat may be briefly applied for a period (e.g. 3 seconds) to the surface of the epoxy resin mixture (e.g. using a handheld propane torch that produces heat at temperatures of approximately 2,000° C. depending on fuel/air mixture, flow rate, air temperature and humidity) in order to burn off any foreign dust or debris and help get rid of any air bubbles that may have formed during blocks 307 through 309.

At block 311, the material mixture is left to cure for a period of time (e.g. 48 hours) at room temperature in a dust free and dry environment. The composite may be placed over a completely flat surface to ensure the material evenly settles over the desired area. The composite may also be covered with a shielding device (e.g. plastic tub, metal enclosure, etc.) to prevent any dust or debris from contaminating the composite during the curing process. If photolumiscent pigment greater than 20 microns is used in the epoxy mixture, it is important not to bump or move the surface of which the composite rests on to prevent the pigment from shifting within the resin (e.g. the pigment may group together and settle on one side of epoxy resin which will in turn produce an uneven luminescence in the composite).

Figure 4:
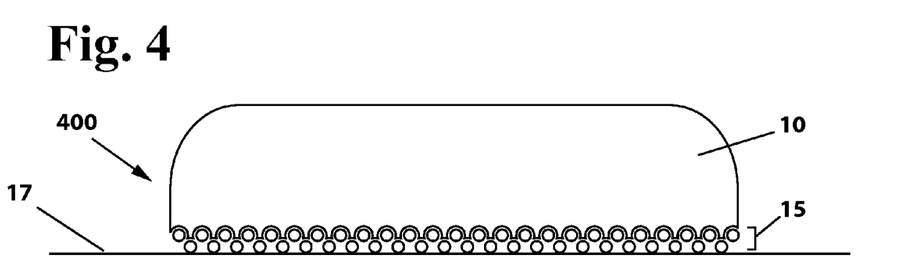
FIG. 4 shows a cross-sectional view of an exemplary material adhesive composite in accordance with one embodiment.

In another embodiment, a versatile material composite as shown in FIG. 4 can be created without the use of a vinyl layer entirely. Material mixture 10 is laid directly over adhesive 15, thereby reducing the cost of the product as well as the potential parting of composite layers thus making a more durable product.

FIG. 4 shows a cross-sectional view of an exemplary material adhesive composite 400 in accordance with one embodiment. Material 10 (e.g. formulations of epoxy, urethane, silicone, plastic, rubber, etc.) which may be optically clear, opaque, pigmented or a combination thereof is selected. Material 10 is affixed to adhesive 15 (e.g. CPD 2500 Transfer Adhesive Laminate made by Coated Products Division of 6761 Thompson Rd. North Syracuse, N.Y. 13211). Adhesive 15 may be optically clear, opaque, or a combination thereof and may be varying degrees of tack, from low to permanent. In one exemplary embodiment adhesive 15 may be pressure sensitive and contain a low tack to allow for a non-permanent application to surface 17 (e.g. mobile devices, screen displays, metal, glass, etc.). The deposit of material 10 over adhesive 15 creates a stronger bond than when resin 10 is deposited over conventional vinyl both from the tack and physical surface structure of adhesive 15 (e.g. microsphere adhesive). In one exemplary embodiment, an optically clear material 10 (e.g. Deco-Coat 2550 Resin System) is deposited over an optically clear adhesive 15. With the removal of vinyl layers 14 and 16 from FIG. 1 comes unmatched levels of material clarity. The light that passes through material 10 only has one layer more to pass through (e.g. adhesive 15) before reaching surface 17 thus removing added potential for light to be further manipulated (e.g. absorbed, reflected, refracted, warped, etc.) so that surface 17 may be clearly visible through material adhesive composite 400.

In another embodiment of material adhesive composite 400, different types of pigments may be mixed within material 10 to give it color and/or physical properties such as photoluminescence or combinations thereof (e.g. resin mixture discussed in block 206 of FIG. 2 using photoluminescent pigment 18). If the desired material adhesive composite 400 is to be opaque, adhesive 15 may not be clear.

FIGS. 5A through 5D show an embodiment of material adhesive composite 400 at different stages of production utilizing process 600 from FIG. 6.

Figure 5A:
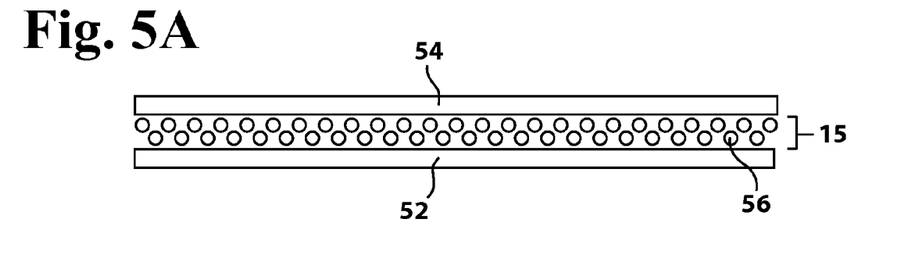
FIG. 5A shows a cross-sectional view of an exemplary adhesive with a double liner in accordance with one embodiment.

FIG. 5A shows a cross-sectional view of an exemplary adhesive 15 with double liner 52, 54 in accordance with one embodiment. Sandwiched in between top liner 54 and bottom liner 52 is adhesive 15. In one exemplary embodiment, adhesive 15 may be composed of microspheres 56 or other adhesive types (e.g. double-sided, acrylic, pressure sensitive, etc.)

Figure 5B:
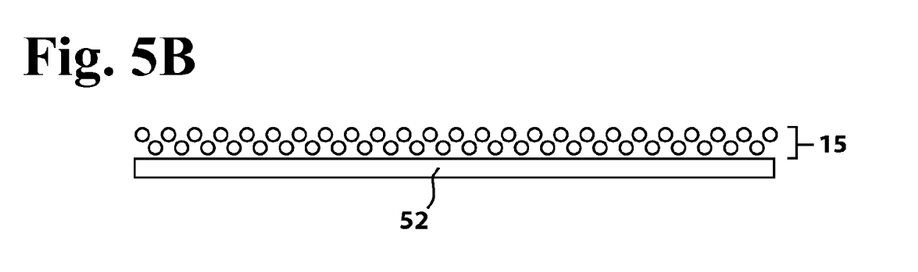
FIG. 5B shows a cross-sectional view of an exemplary adhesive with a top liner removed in accordance with one embodiment.

FIG. 5B shows a cross-sectional view of an exemplary adhesive with a top liner 54 removed in accordance with one embodiment thus exposing the top surface of adhesive 15.

Figure 5C:
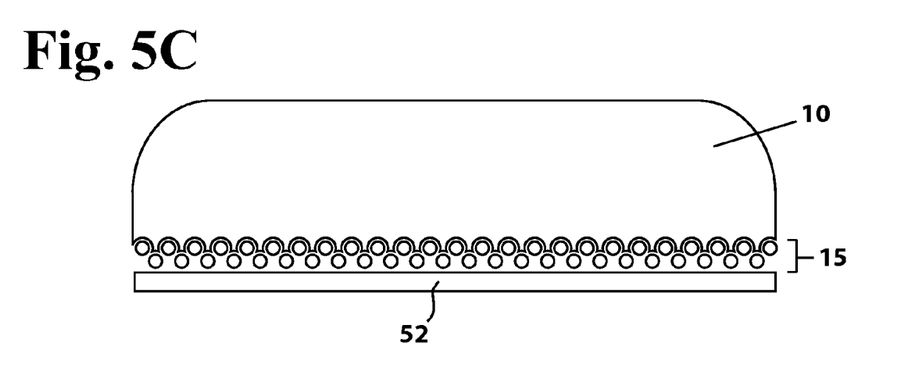
FIG. 5C shows a cross-sectional view of a material mixture deposited over an exemplary adhesive in accordance with one embodiment.

FIG. 5C shows a cross-sectional view of material mixture 10 deposited over an exemplary adhesive 15 in accordance with one embodiment. A material mixture (e.g. an epoxy mixture discussed at block 306 of process 300 from FIG. 3) is deposited over the surface of adhesive 15 with bottom liner 52 still attached.

Figure 5D:
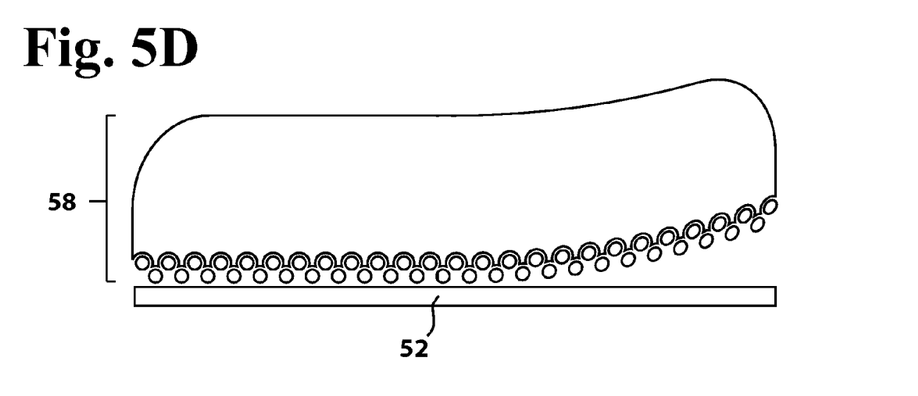
FIG. 5D shows a cross-sectional view of an exemplary material adhesive composite during removal from a base liner in accordance with one embodiment.

FIG. 5D shows a cross-sectional view of an exemplary material adhesive composite 58 during removal from base liner 52 in accordance with one embodiment. Material adhesive composite 58 is ready to be adhered to a desired surface, or may stored on liner 52 for use at a later time.

FIG. 6 shows a flowchart of an exemplary process for creating a material adhesive composite in accordance with one embodiment. Process 600 can be used to manufacture material adhesive composite 400 and could be a computer controlled process.

At block 601, an adhesive (e.g. double-sided, acrylic, microsphere, pressure sensitive, etc.) with a double liner protecting both sides of desired adhesive is selected (e.g. CPD 2500 Transfer Adhesive Laminate).

At block 602, the desired shape of the final product is then die cut through the adhesive sheet. If there are additional shape cuts within the primary die cut (e.g. camera hole 28 for skin 24 in FIG. 7A) the excess material may then be removed.

At block 603, the top liner is then peeled off of the die cut exposing the top of the adhesive. To avoid contaminating the layer with dust or particles that may inadvertently adhere to the adhesive, block 603 may be executed in a clean, level, and dust-free environment.

At block 604, a material mixture (e.g. epoxy, urethane, silicone, plastic, etc.) is selected. In one exemplary embodiment, a material mixture composed of epoxy and hardener components (e.g. as prepared in the amounts discussed in block 306 of process 300 from FIG. 3) is prepared. At block 604 pigment may optionally be added to mixture. If colored pigment is desired, the pigment may be added to the mixture at varying degrees depending on desired saturation and opacity of final color. Conversely, if no pigment of either color or luminescence is desired, only the epoxy and hardener components would be used.

In one embodiment, the process described in blocks 605 through 609 may be performed in a substantially similar manner to that shown in blocks 307 through 311 from process 300 of FIG. 3 and need not be discussed again in this section.

Figure 7A:
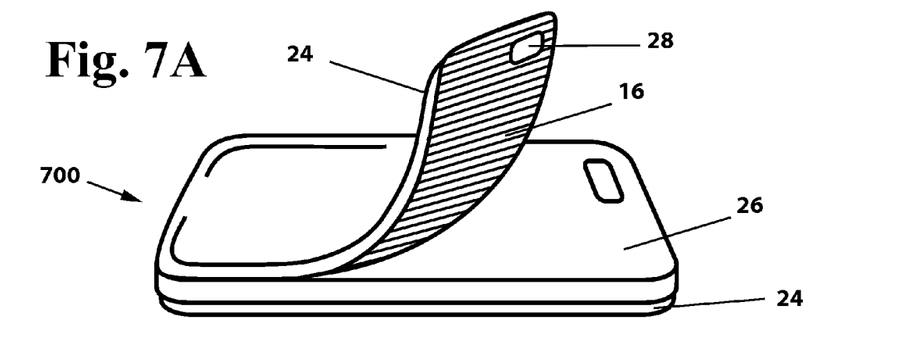
FIG. 7A shows an elevated view of an exemplary material composite adhesive skin as applied to the back of a device in accordance with one embodiment.

FIG. 7A shows an elevated view of an exemplary material composite skin 24 as applied to the back of device 26 in accordance with one embodiment. Drawing 700 shows photoluminescent material composite 100 or adhesive material composite 400 in the form of skin 24 as applied to the back of device 26. Skin 24 may be varying degrees of thickness and can be cut into any shape, with or without cutouts 28, so that it best fits the device or any designated part thereof. In one embodiment, adhesive 16 is non-permanent, repositionable and pressure sensitive allowing for skin 24 to be easily applied and removed without leaving any residue on surface of device 26.

Figure 7B:
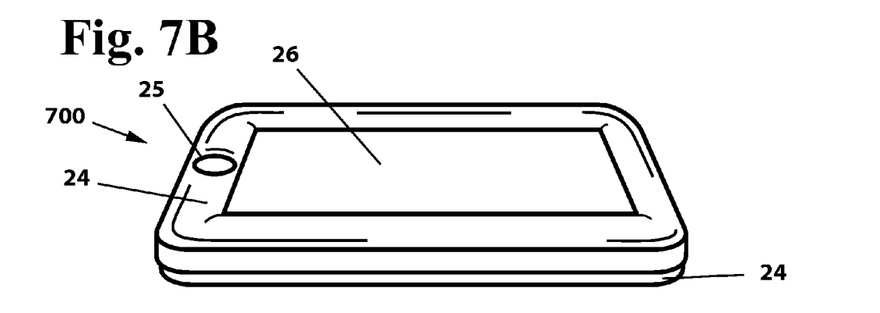
FIG. 7B shows another elevated view of an exemplary material composite adhesive skin affixed to the front of a device in accordance with one embodiment.

FIG. 7B shows another elevated view of an exemplary material composite skin 24 affixed to the front of a device 26 in accordance with one embodiment. Drawing 700 shows a front view of device 26. In one exemplary embodiment, skin 24 is fully applied.

Figure 7C:
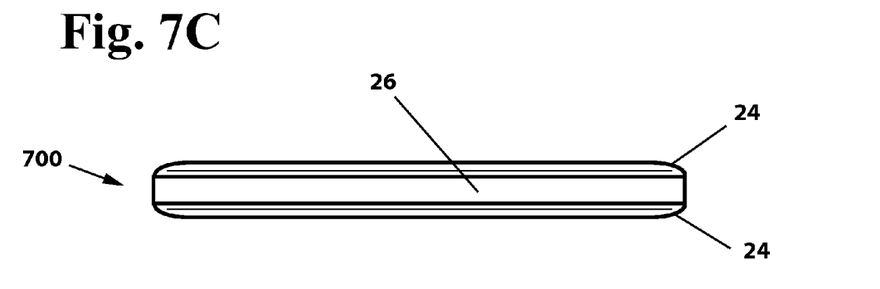
FIG. 7C shows a side view of an exemplary material composite adhesive skin affixed to the front and back of a device in accordance with one embodiment.

FIG. 7C shows a side view of an exemplary material composite skin 24 affixed to the front and back of a device 26 in accordance with one embodiment. Drawing 700 shows a side view of device 26, in one exemplary embodiment, with skin 24 fully applied to the front and back of device 26.

Figure 7D:
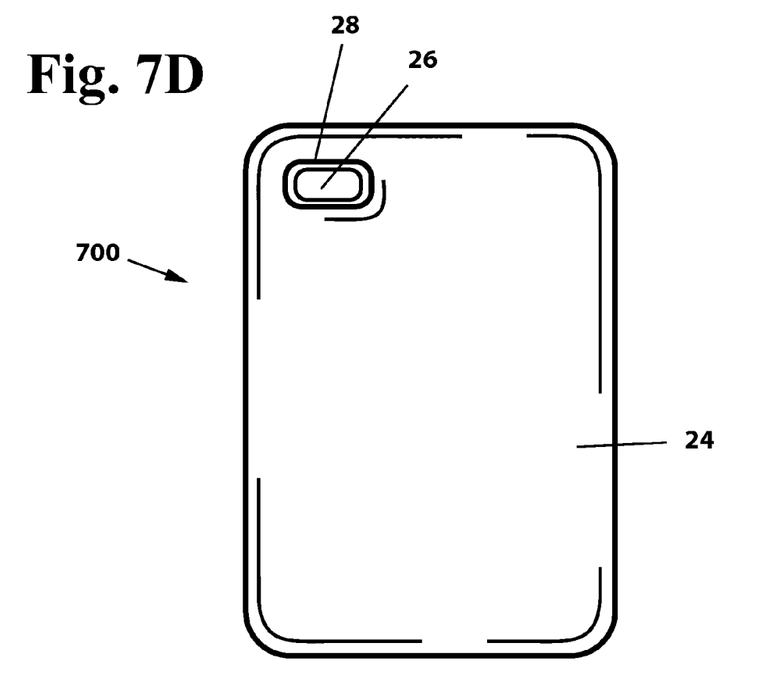
FIG. 7D shows a front perspective view of an exemplary material composite adhesive skin affixed to the back of a device in accordance with one embodiment.

FIG. 7D shows a front perspective view of an exemplary material composite skin 24 affixed to the back of a device 26 in accordance with one embodiment. Drawing 700 shows a front view of skin 24, in one exemplary embodiment, with cutout 28 and fully applied to device 26.

Figure 7E:
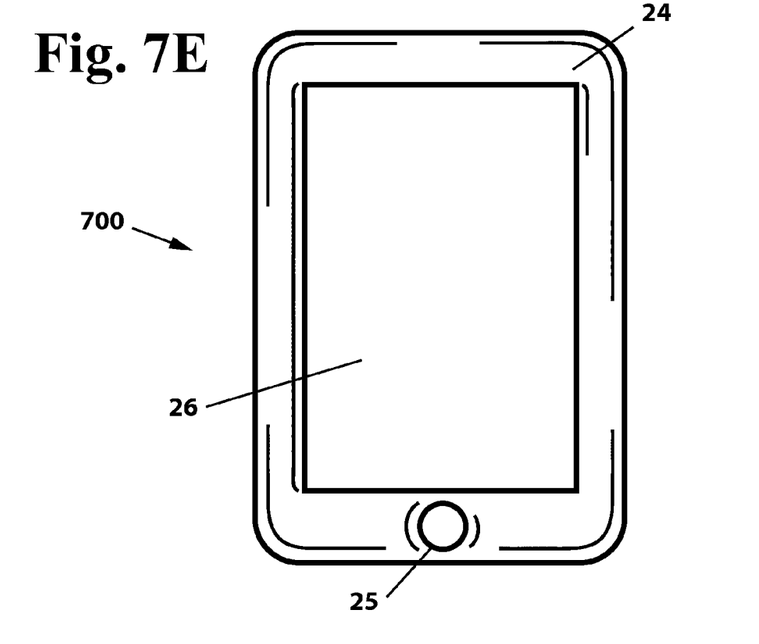
FIG. 7E shows a front perspective view of an exemplary material composite adhesive skin affixed to the front of a device in accordance with one embodiment.

FIG. 7E shows a front perspective view of an exemplary material composite skin 24 affixed to the front of a device 26 in accordance with one embodiment. Drawing 700 shows a front view of skin 24, in one exemplary embodiment, with cutout 25 (e.g. for a device button) fully applied to device 26. Although the object pictured in FIG. 7A through 7E may be an electronic device, it could be any device or object (e.g., tablet, smart phone, computer, game console, PDA, cell phone, display device, or the like).

Figure 8A:
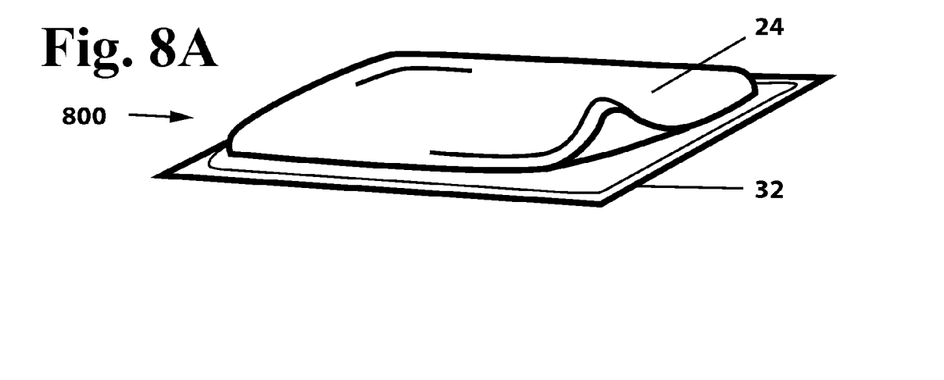
FIG. 8A shows an elevated side view of an exemplary material composite adhesive skin attached to a liner sheet in accordance with one embodiment.

FIG. 8A shows an elevated side view of a material composite skin 24 attached to a liner sheet 32 in accordance with one embodiment. Drawing 800 shows photoluminescent material vinyl 100 or adhesive material composite 400 as skin 24 attached to its base liner 32 as it may be at purchase before application (e.g., to a device or object). Skin 24 may be peeled from liner 32 and placed over an object. Liner sheet 32 can be discarded or kept to store skin 24 for use at a later time.

Figure 8B:
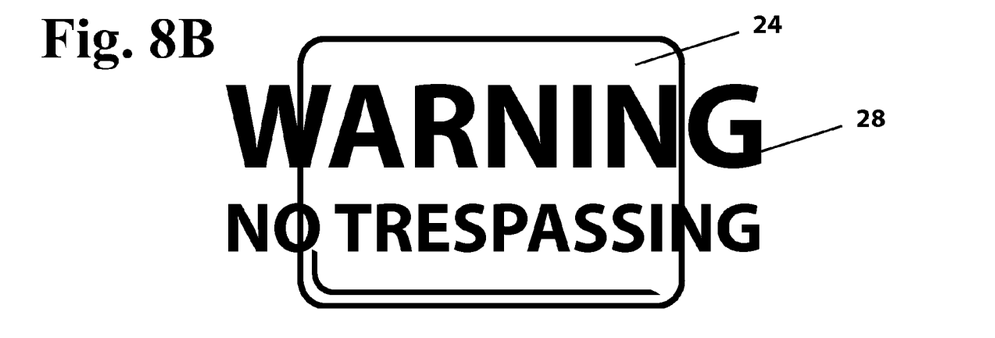
FIG. 8B shows a front view of an exemplary clear photoluminescent material composite skin affixed to a marked surface in daylight in accordance with one embodiment.
Figure 8C:
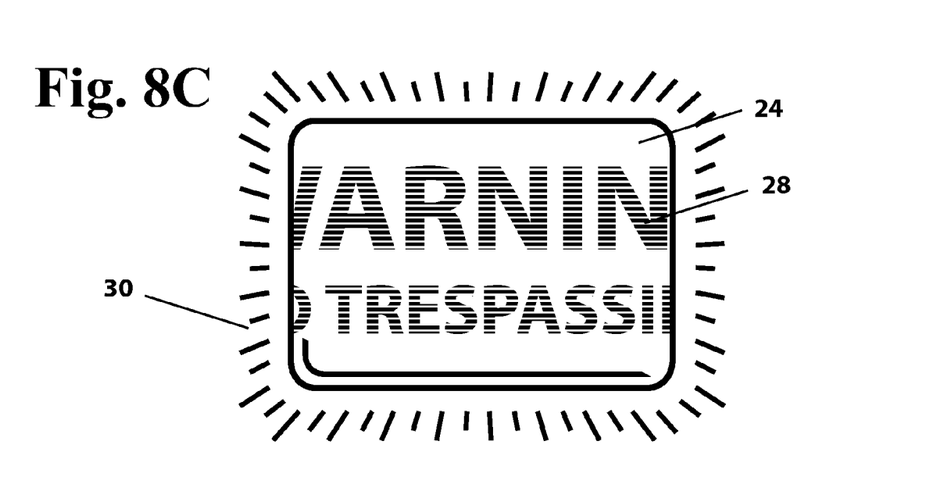
FIG. 8C shows a front view of an exemplary clear photoluminescent material composite skin affixed to a marked surface in dark conditions in accordance with one embodiment.

FIG. 8B shows a front view of an exemplary clear photoluminescent material composite skin affixed to a marked surface in daylight in accordance with one embodiment Skin 24 may be in the form of clear photoluminescent material vinyl 100 or clear photoluminescent material adhesive composite 400. Skin 24 is affixed to a surface with markings 28. In lit conditions, light passes through skin 24 so that markings 28 below are visible. FIG. 8C shows skin 24 from 8B in low-lit conditions. Luminescence 30 from skin 24 is able to illuminate markings 28 directly below making them visible to viewer. A clear photoluminescent material composite skin may be used to adhere over emergency or directional signage, exit paths (e.g. buildings, vehicles, airplanes), or other such markings or objects that would benefit from being visible in low lit situations. Clear photoluminescent material composite skin would be a cost effective solution for those who want photoluminescent properties applied to an existing object without having to remanufacture the object with photluminescent properties. In one exemplary embodiment, clear photoluminescent material composite skin would be non-permanent, operable for temporary adhesion to surfaces or objects that would benefit from being visible in low-light situations such as light switches, or areas on walls, floors, and any other surface or object in a temporary living space.

What is claimed is:

1. A composite comprising:
    a film layer;
    a first adhesive layer above said film layer;
    a second adhesive layer below said film layer;
    a material mixture deposited above said film layer; and
    a pigment mixture having a photoluminescent property, wherein said material mixture comprises said pigment mixture.

2. The composite of claim 1 wherein said film layer comprises a vinyl material.

3. The composite of claim 1 wherein said film layer is at least one of clear, mirrored, reflective, and graphically printed.

4. The composite of claim 1 further comprising:
    a double-sided adhesive, wherein a portion of said double-sided adhesive is deposited above a top portion of said film.

5. The composite of claim 1 wherein said material mixture comprises a material selected from the group consisting of epoxy, urethane, polyurethane, and silicone.

6. The composite of claim 1 wherein said photoluminescent property is selected from the group consisting of phosphorescence and fluorescence.

7. The composite of claim 1 wherein said material mixture has a thickness greater than 0.040 inches.

8. A material adhesive composite comprising:
    a material mixture;
    a pigment mixture, wherein said pigment mixture is distributed within said material mixture, and wherein said pigment mixture is photoluminescent; and
    first adhesive layer, wherein said material mixture is deposited above said first adhesive layer; and
    a second adhesive layer, wherein the second adhesive layer is below the first adhesive layer.

9. The material adhesive composite of claim 8 wherein said material mixture comprises a material selected from the group consisting of epoxy, urethane, polyurethane, and silicone.

10. The material adhesive composite of claim 8 wherein said adhesive layer is double sided.

11. The material adhesive composite of claim 8 wherein said adhesive layer is pressure sensitive.

12. The material adhesive composite of claim 8 wherein said adhesive layer is operable for removably affixing said material adhesive composite from a surface.

13. The material adhesive composite of claim 12 wherein a portion of said surface is visible through said adhesive layer and said material mixture.

14. The material adhesive composite of claim 8 wherein said adhesive layer comprises microspheres.

15. The material adhesive composite of claim 8 wherein said adhesive layer comprises acrylic.

16. The material adhesive composite of claim 8 wherein a first portion of said material mixture is optically clear and a second portion of said adhesive is optically clear.

17. A method for manufacturing a material composite, comprising:
    forming an epoxy mixture comprising a photoluminescent pigment; and
    applying said epoxy mixture to above a vinyl layer, wherein a first adhesive layer is above said vinyl layer; and
    applying a second adhesive layer on a side of said vinyl layer opposite said first adhesive layer.

18. The method of claim 17 wherein said photoluminescent pigment is operable to glow in low light conditions.

19. The method of claim 17 wherein said material composite is operable to output a composite color comprising a first color of said photoluminescent pigment and a second color of a portion of said vinyl layer.

20. The method of claim 17 wherein said photoluminescent pigment is operable to output a luminescent pattern based on a pattern on said vinyl film.

* * * * *